Oct. 5, 1965     C. P. FOWLER     3,209,597
PRESSURE MEASURING INSTRUMENT
Filed Sept. 25, 1962
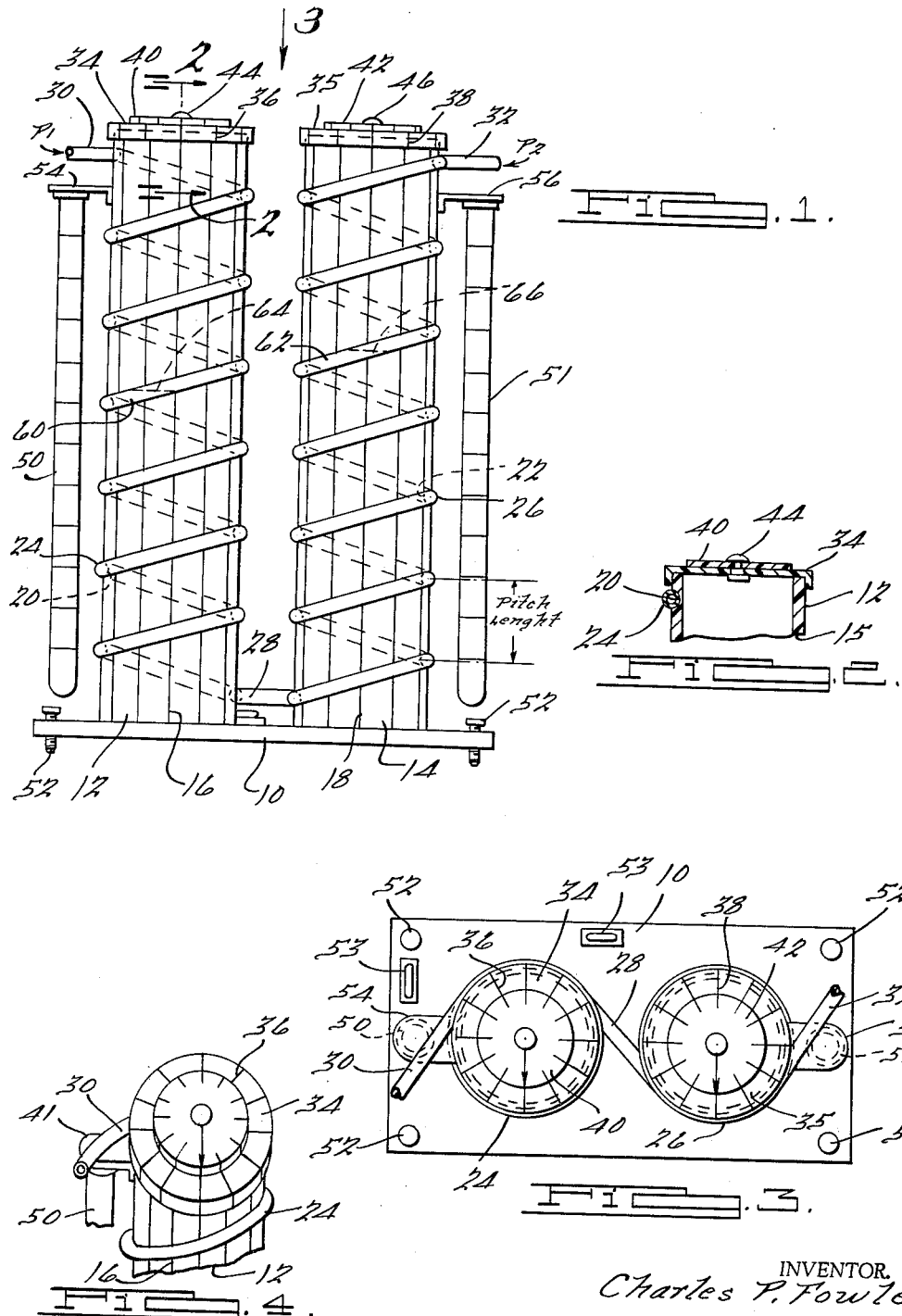
INVENTOR.
Charles P. Fowler
BY
Harness, Dickey & Pierce
ATTORNEYS United States Patent Office 3,209,597
Patented Oct. 5, 1965

3,209,597
PRESSURE MEASURING INSTRUMENT
Charles P. Fowler, Jackson, Mich., assignor to Walker Manufacturing Company, Racine, Wis., a corporation of Delaware
Filed Sept. 25, 1962, Ser. No. 226,025
3 Claims. (Cl. 73—401)

This invention relates to a pressure measuring device and more particularly to a precision manometer for measuring minute pressure variations or the like.

Manometers are one of the oldest measuring instruments known and conventionally comprise a graduated tube containing a liquid or fluid movably responsive to external pressure variations to indicate the amount of variation by measurement of the movement of the liquid within the tube. The tubes are conventionally graduated to measure so many units pressure change per increment of movement along the length of the tube. The most common type of manometer is a straight vertical tube containing a liquid such as water or mercury or the like having the ends of the tube beyond the liquid connected to pressure sources.

Small changes in position of the manometer liquid are difficult to measure because the end surfaces of the fluid in the tube are not straight but have a curved shape dependent on the properties of the fluid and tube diameter. Extremely fine variations in pressure are not capable of being measured accurately on conventional U-tube type equipment or inclined portable manometers.

The principal object of the present invention is to provide a precision manometer with which pressure variations may be measured to a very fine degree.

Another object of the present invention is to provide a manometer in which the manometer tube is spirally or helically wound in a manner facilitating reading of pressure changes as reflected by variations of fluid level of fluid contained within the tube.

The principles of the present invention are hereinafter disclosed in detail by reference to an illustrative embodiment of a manometer shown on the accompanying drawing wherein:

FIGURE 1 is a side elevational view;
FIGURE 2 is a sectional view taken along the line 2—2 in FIGURE 1;
FIGURE 3 is a top view taken in the direction of arrow 3 in FIGURE 1; and
FIGURE 4 is a partial perspective view of a portion of the apparatus shown in FIGURE 1.

In general, the present invention encompasses a manometer formed by a realtively long tubing means wrapped about a cylindrical support in a spiral to facilitate observation of minute movement of fluids within the tubing means and for compactness. The tubing means is secured to the cylindrical support in a non-vertical, non-horizontal position inclined between horizontal and vertical planes. The amount of inclination may be defined by the angle of inclination of the tubing means relative to a horizontal plane or by the pitch as determined by the ratio of horizontal to vertical displacement of a length of the tubing as viewed in side elevation. The term pitch length is hereinafter used to define the vertical distance between identical points on adjacent spiral portions of the tubing means. The smaller the pitch length, the further the liquid must travel circumferentially to attain an equivalent vertical displacement for a given pressure variation and the more easily the instrument may be read. The cylindrical member may have any diameter depending on the accuracy desired, the larger the diameter the more accurate the reading. A reading dial is provided on the top of the cylinder and associated with graduations on the sides of the cylinder which are calibrated in any suitable manner to enable pressure variations to be read in terms of fluid displacement in the tubing means. In general, one revolution of the dial is equivalent to one pitch length of the tubing means and the dial is graduated to divide the pitch length into equal increments. Accordingly, the pitch length may be fractionally divided into tens, hundreds, thousands, or any other measuring unit, and the vertical displacement of the fluid measured with extreme accuracy.

Referring now to FIGURE 1, the manometer comprises a suitable support base 10 on which a pair of vertically extending parallel support cylinders 12, 14 are mounted. The cylinders 12, 14 are shown to have equal lengths and equal diameters in the illustrative embodiment. The diameters of the cylinders may be varied as desired.

In the preferred embodiment, the cylinders are hollow and made from a clear plastic material such as Lucite or glass so that the manometer fluid may be viewed from all sides. The cylinder wall 15 is relatively thin compared with the cylinder diameter. The outer peripheral surfaces of the support cylinders are divided into a series of longitudinally extending parallel measurement lines 16, 18. The lines 16, 18 are equally circumferentially spaced about the outer periphery of the cylinders and are graduated to reflect pressure variations in accordance with movement of a fluid through a spirally wound tube.

Each of the support cylinders 12, 14 are provided with radially inwardly extending spiral grooves or notches 20, 22 in the outer peripheral surfaces thereof. The grooves provide seats for tubing means 24, 26. The tubing means 24, 26 are adapted to be spirally wound and seated in the spiral tubing seats 20, 22 in any convenient manner. The tubing portions 24, 26 are connected at 28 to one another and the upper ends 30, 32 are connected to suitable pressure sources for measurements. The spacing of lines 16, 18 depends, of course, on the pitch of the tubing and the diameter of the cylinder.

Dial caps 34, 35 may be mounted on the top of the cylinders 12, 14 and provided with radially extending graduated lines 36, 38 corresponding to the graduated lines 16, 18 on the periphery of the cylindrical members. Pointer plates 40, 42 may be mounted on the top of the indicator caps 34, 35 and rotatably secured relative thereto by pin means 44, 46 to facilitate reading of the instrument. Scales 50, 51 graduated into units of pitch length and ½ pitch length may be secured to the sides of the cylinders 12, 14 by bracket means 54, 56 to enable quick visual determination of the change in vertical height of the liquid in terms of pitch lengths. In addition, instrument leveling screws 52 and and levels 53 may be provided on the base.

In operation, with the upper ends 60, 62 of a suitable fluid located in the tubes 24, 26, the upper surfaces 64, 66 of the fluid will reach varying vertical levels in the tubes depending on the variation in pressures obtained at the open ends 30, 32 of the tubes. Because of the inclined attitude of the tubing 24, 26, the upper surfaces 64, 66 of the fluid tend to be inclined relative to the longitudinal axis of the tubing and tend to define surface areas considerably greater than the cross sectional area of the tubes which may facilitate more accurate measurements. The configuration and location of the upper surfaces of the fluid relative to the tubing walls is variable depending on the diameter of the tubing and the angle of inclination thereof, and on the physical properties of the fluid.

The cylinders 12, 14 may be graduated by the lines 16 and 18 to reflect very small pressure variations which may be indicated, for example, by a pitch length change of the position of the fluid ends of .001 inch or smaller, The more the angle of the spiral of the tubing is increased from vertical toward horizontal, the longer will be the measurable circumferential displacement of the fluid for a given vertical displacement of the fluid. Consequently, whereas in conventional manometers, a vertical rise of one increment of the measuring fluid in the tube might, for example, be equivalent to one increment of pressure change; in the present apparatus a fraction of the same increment of pressure change will result in a much longer length of travel of the measuring fluid in the tubing but only a corresponding fractional vertical displacement. In other words, the vertical displacement of the fluid in response to a given pressure change remains constant regardless of the manometer being used. However, the length that the fluid travels to attain the same change in vertical position is greatly increased by virtue of the spirally wound tubing so that minute changes in pressure are reflected by substantial movements of the fluid within the inclined tube which may be much more easily and accurately measured.

Since the inventive principles hereinbefore disclosed are susceptible of incorporation in alternative embodiments, it is intended that the appended claims be construed to include the inventive principles wherever applied.

What is claimed is:

1. A manometer comprising a base, a plurality of spaced separate cylindrical support members mounted on said base in vertically extending parallel relationship, tubing means spirally mounted on each of said cylindrical support members, a connecting passage adjacent the bottom of said cylindrical support members and connecting the lower ends of said tubing means, an indicating fluid confined in said tubing means, portions of the upper ends of said tubing means being connectible to pressure sources to be measured, and measuring means to measure displacements of a measuring fluid in said tubing means in response to variations in pressures at the pressure sources.

2. A measuring instrument comprising a base, leveling means mounted on said base, a pair of cylindrical plastic tubular supports mounted on said base and extending upwardly therefrom in parallel spaced relationship, a first tube means spirally wound on one of said supports with terminal portions located adjacent the top and bottom of said one of said supports, a second tube means spirally wound on the other of said supports with terminal portions located adjacent the top and bottom of said other of said supports, connecting tube means connecting the lower terminal portions of each of said tube means, an indicating fluid provided in said tube means for said pressure measurements, and the top portions of each of said tube means being provided with inlets for connection to pressure sources, and having for each of said tube means, a first measuring means attached to said supports and extending substantially from top to bottom of said tube means for measuring vertical increments of change of position of said indicating fluid, a second measuring means on said supports extending circumferentially about said supports for measuring horizontal increments of change of position of said indicating fluid.

3. The invention as defined in claim 2 and having an end cap on the top of each of said supports, radially extending indicia provided on said end cap and a rotatable indicator mounted on said end cap for cooperation with said indicia.

References Cited by the Examiner

UNITED STATES PATENTS

| | | | |
|---|---|---|---|
| 841,454 | 1/07 | Sargent | 73—401 |
| 2,303,111 | 11/42 | Cuyler et al. | 73—401 X |
| 2,384,159 | 9/45 | Cuyler et al. | 73—401 X |

LOUIS R. PRINCE, *Primary Examiner.*

JOSEPH P. STRIZAK, RICHARD C. QUEISSER,
*Examiners.*